United States Patent [19]

Cragin

[11] 4,267,685
[45] May 19, 1981

[54] BULLROPE

[76] Inventor: John J. Cragin, 1517 Sunnyridge Rd., Nampa, Id. 83651

[21] Appl. No.: 114,124

[22] Filed: Jan. 21, 1980

[51] Int. Cl.³ .................. B68B 1/00; A01K 29/00
[52] U.S. Cl. .................................. 54/1; 119/29
[58] Field of Search .................. 119/29, 96, 109, 110, 119/111; 54/1, 34, 64; 24/115 R, 115 F, 115 H, 115 K

[56] References Cited

U.S. PATENT DOCUMENTS

| 466,656 | 1/1892 | Covert | 54/34 X |
|---|---|---|---|
| 1,924,992 | 8/1933 | Jasper | 24/115 R |
| 2,458,489 | 1/1949 | Hallander | 119/109 |
| 3,605,384 | 9/1971 | Pacini | 119/96 X |
| 3,734,049 | 5/1973 | Humbert | 54/1 X |
| 4,118,059 | 10/1978 | Lindsay | 24/115 R X |

*Primary Examiner*—Gene Mancene
*Assistant Examiner*—Robert P. Swiatek
*Attorney, Agent, or Firm*—Paul F. Horton

[57] ABSTRACT

A bullrope including a main body portion, with handle, a loop member with eye, and a tail portion. The rope is placed about the girth of a bull with the tail portion engaging the eye of the loop and the remainder of the tail portion wrapped once or twice about the bull rider's hand for cinching the rope. A pair of temporarily engaging fastening members are provided on the tail portion to form a safety loop which may be readily grasped by the rodeo clown to free the rider's hand from the handle should the rider's hand accidently become entangled in the handle and tail portion of the bullrope.

6 Claims, 5 Drawing Figures

BULLROPE

BACKGROUND OF THE INVENTION

1. Field of the Invention

This invention relates to bullropes as used by rodeo performers, in general, and, to bullropes having a safety catch, in particular.

2. Description of the Prior Art

To understand the problem involved, a short discussion of how the rider is mounted to the bull is in order. The bullrope, by which means the rider mounts the bull, is placed about the girth of the animal just in back of the front legs with the tail of the rope inserted through an adjustable knot eye at the head of the rope. The rider mounts the animal and cinches the bullrope about the girth by wrapping the tail of the rope about his hand once or twice and then grasping the handle on the main body of the rope. His other hand must, according to the rules of the sport, remain free. After wrapping the tail of the rope about his hand, the remainder of the tail portion, about two to three feet in length, swings freely.

Not infrequently, a bullrider's hand will become entangled in the bullrope surrounding the animal and the rider is unable to free himself from the bull. When this occurs, the rider is dragged by the bull until his hand becomes disentangled from the bullrope, usually with the assistance of the rodeo clown. The rider is placed in great peril until his hand is freed and, likewise, the rodeo clown is placed in danger until he has freed the hand.

In order to assist the rider, it is necessary for the clown to grab the freely swinging end of the tail portion of the rope. This maneuver is extremely difficult in that the rope can only be conveniently grasped only adjacent the rider's entangled hand. Obviously, timing is critical, and severe injuries may and do result unless the rider is freed rapidly. There are presently no means known to applicant for assisting the clown in his attempt to free the rider's hand under such circumstances.

SUMMARY OF THE INVENTION

The present invention is a bullrope which includes a pair of temporarily engageable fastening members which, when fastened, are operable to form a closed loop of the tail section of the bullrope which may be readily grasped by an assistant. A more complete description may be found in the appended claims.

It is therefore a general object of the present invention to provide a bullrope which may be readily disentangled from a rider's hand.

More specifically, it is an object of the present invention to provide a bullrope which includes a pair of temporarily mateable fastening members which defines a readily grasped loop in the tail portion of the bullrope when fastened.

Even more specifically, it is an object of the present invention to provide a bullrope having a pair of temporarily engagable Velcro fasteners operable to form a safety catch on the tail portion of a bullrope, when fastened.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
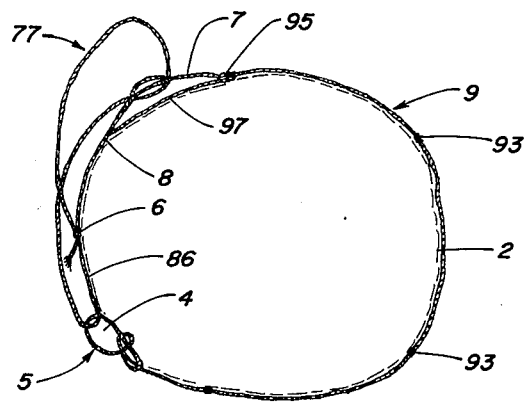
FIG. 1 is a perspective view of the bullrope of the present invention shown encircling the girth of an animal.
Figure 2:
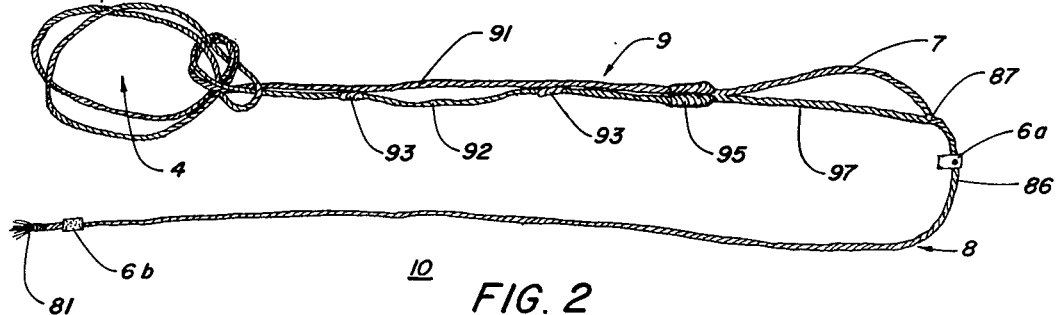
FIG. 2 is a perspective view of the bullrope of the present invention showing fastening members in an unfastened condition.

Referring now to the figures, an embodiment to be preferred of a bullrope 10 made according to the present invention is disclosed. Bullrope 10 includes a main body portion 9 including a handle 7, a loop member 5, a tail portion 8 and fastening means designated generally by the numeral 6.

The body, handle, loop member and tail are all preferably made of hemp or other vegetable fiber which has been twisted and woven in conventional manner, into the individual but integral structures. The rope includes a loop member 5 which may be woven into a substantially annular ring, but which preferably consists of a loop formed by an adjustable, non-slip knot at the head of the bullrope such as a bowline knot. Adjustment of the knot permits the bullrope to be effectively shortened or lengthened to encircle animals 2 of varying girths. The loop member 5, under any circumstance, must include an eye 4 for receiving tail 8 of the rope.

The main body portion 9 of the bullrope is attached to and extends from loop 5 to tail portion 8. The body portion of bullrope 10 may include a pair of ropes 91 and 92 which are fastened together at desired intervals by a woven portion 93 known in the art as "crow's feet" to prevent entanglement of the top ropes. Ropes 91 and 92 coalesce into a woven block 95 located approximately four feet from loop member 5. The block, which is about 3" in length, provides a base for the beginning of handle 7 which is a substantially flat braided division of the rope fibers. Handle 7, approximately 15 inches in length is of slightly greater length than base 97 of body portion 9 to provide room for the first of the rider between the handle and the base as he clutches the handle. The base 97 fits snugly against the back of the animal as the bullrope encircles its girth. Handle 7 and base 97 are united to provide a single rope which is quite flat and tightly woven and which is known in the trade as a wear strip 86. The point of unison between handle and base is known as "the tie-in", designated by the numeral 87. Tail portion 8 is attached to body portion 9 at the tie-in and extends for approximately 6 feet, having a terminal free end 81. The tail section may taper from the wear strip to its termination to lessen bulk and weight.

Figure 4:
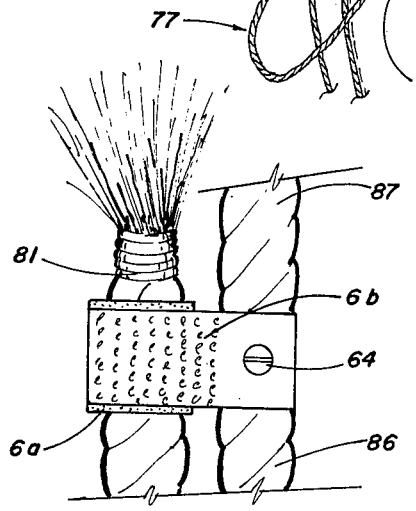
FIG. 4 is a detailed view of one embodiment of the fasteners of the present invention shown in engagement.
Figure 5:
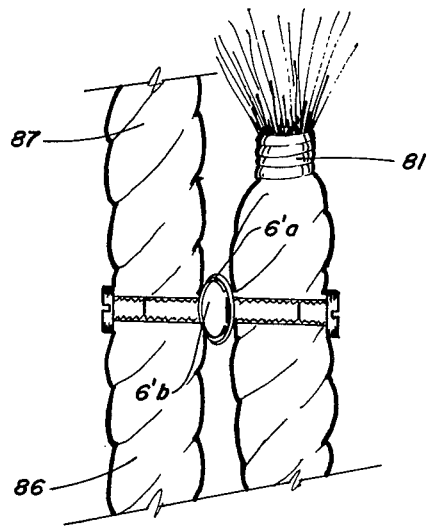
FIG. 5 is a detailed view of a second embodiment of the fasteners of the present invention.

The fastening means of the present invention, shown to particular advantage in FIGS. 4 and 5, includes two mateable members, 6a and 6b in one embodiment and 6'a and 6'b in a second embodiment which may temporarily but severely engage one another to form a catch-loop 77 in tail portion 8 of bullrope 10. Catch-loop 77 is for the sole purpose of enabling one assisting a rider whose hand has become entangled in the bullrope to rapidly and securely grasp the tail portion 8 and to pull it free from the rider's hand thereby freeing the rider from the bull. Conventionally, the tail portion of a bullrope hangs freely from the rider's hand and is extremely difficult to grasp as it swings erratically with every movement of the bull. Referring now to FIG. 4, in particular, preferred fastening members 6a and 6b are shown. The preferred fasteners are made of two strips of fabric material, one of the strips, 6a, having a multiplicity of minute loop members mounted on its surface and the other strip, 6b, having a multiplicity of minute hook members mounted on its surface. The hook members are adapted to engage the loop members to hold the two strips in temporary engagement. The material is sold and advertised under the trademark "Velcro". Fastener 6a is attached either by sewing or mechanical means to the tail portion preferably adjacent the handle at the joinder of the tail and body portions. Exact placement is not critical. Fastener 6b is attached also by sewing or mechanical means to the tail portion adjacent its tip. It is obvious that fasteners 6a and 6b could be transposed in their placement with the same results.

FIG. 5 shows another embodiment of the fasteners of the invention in which a common metallic or plastic snap fastener 6'a is used for temporarily engaging a mating fastener 6'b to form a catch-loop in the tail portion. Male fastener 6'b may be transposed in its placement with female fastener 6'b without changing the results. Fasteners 6 are preferably connected to the bullrope by holders which allow their convenient removal and replacement when needed. One type of preferred holder is shown in FIG. 5. The holder includes a slotted head section having a depending internally threaded cylindrical portion and a threaded bolt for engaging the threaded cylinder. The threaded bolt may be directly attached to the fastener, 6'a in the example, or, when using Velcro as a fastener, may include a slotted head section 64 as shown in FIG. 4 to hold the fabric in place.

Figure 3:
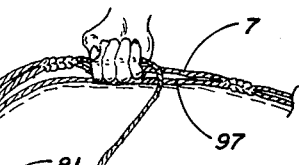
FIG. 3 is a perspective view of the bullrope of the present invention showing positioning of bullrope and formation of catch loop when fastening members are temporarily fastened to one another.

In using the bullrope of the present invention, the rope is first placed about the girth of the bull with handle 7 being placed at the top of the bull in a desired position, as for example shown in FIGS. 1 and 3. Loop member 5 is placed at the lower side of the bull with the loop being adjusted to form a large eye 4 for a small bull or a small eye for a large bull. Tail 8 is inserted in and pulled through the eye of loop 5 and is held in the hand of the rider who has mounted the animal. The rider may cinch the rope to a desired tightness about the bull by simply pulling on tail portion 8. In this position, wear strip 86 engages the loop member 5 and fastener 6b is positioned for fastening. The rider wraps tail portion 8 about his hand one or two times to prevent any slippage of the rope and holds the section so wrapped in tight contact with handle 7. At this time, and just prior to the ride, the mating fastener 6a which is attached to tail portion 8 adjacent free end 81 of the rope is caused to engage 6b to form catch-loop 77. Should the rider's hand become entangled in the rope and the rider unable to release his hand, the rodeo clown grasps the rope at any point on the catch loop and jerks the entangled rope from the hand to free the rider.

Having thus described in detail the preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive. The scope of the invention being indicated by the appended claims rather than by the foregoing description, and all changes which come within the meaning and range of equivalency of the claims are therefore to be embraced therein.

I claim:

1. A bullrope comprising:
    a main body portion operable to surrond the girth of an animal, said body portion being divided so as to form a handle member adapted for grasping by a rider of the animal;
    a loop member having an eye, attached at one end of said body portion to define one end of the bullrope and incapable of moving along the body portion;
    a tail portion attached at an opposing end of said body portion, said tail portion having a free terminal end insertable through the eye of said loop member to cinch the bullrope about the girth of an animal, and
    fastening means located on said tail portion, said fastening means operable to form a temporary loop in said tail portion adapted for grasping.

2. The apparatus as described in claim 1 wherein said fastening means comprises a first connector attached to said tail portion adjacent its terminal free end and a second connector attached to said tail portion adjacent the joinder of said tail portion and said body portion, said second connector adapted to detachably engage said first connector.

3. The apparatus as described in claim 2 wherein said first connector comprises a first strip of Velcro and wherein said second connector comprises a second and mating strip of Velcro.

4. The apparatus as described in claim 3 wherein said first connector and said second connector each include means for removably connecting said connectors to said tail portion of the bullrope.

5. A bullrope comprising:
    a main body portion operable to surround the girth of an animal, said body portion including a flexible handle member adapted for grasping by a rider of the animal;
    an adjustable knot, having an eye, integral with and defining one end of the rope, said knot adjustable to accomodate animals of varying girth;
    a tail portion attached at an opposing end of said body portion and integral therewith, said tail portion having a free terminal end insertible through the eye of said knot to cinch the bullrope about the girth of an animal; and
    a pair of fastening members, removably and temporarily attachable to one another, one of said fastening members affixed to said tail portion of the bullrope adjacent the terminal free end of said tail and the other fastening member affixed to the bullrope adjacent the handle member, said fastening members operable to form a temporary loop of said tail portion of the bullrope when fastened, the loop providing a catch for one assisting the rider to free the rider's hand from said handle member.

6. The apparatus as described in claim 5 wherein one of said fastening members includes a flexible pad having a plurality of flexible loop members and wherein the other pad includes a flexible pad having a plurality of flexible hook members adapted to temporarily engage the loop members of the first pad.

* * * * *